United States Patent [19]
Hunsbedt

[11] Patent Number: 5,339,340
[45] Date of Patent: Aug. 16, 1994

[54] LIQUID METAL REACTOR AIR COOLING BAFFLE

[75] Inventor: Anstein Hunsbedt, Los Gatos, Calif.

[73] Assignee: General Electric Company, San Jose, Calif.

[21] Appl. No.: 92,096

[22] Filed: Jul. 16, 1993

[51] Int. Cl.⁵ .................................. G21C 15/18
[52] U.S. Cl. ............................................ 376/299
[58] Field of Search ............ 376/299, 298, 293, 399, 376/389, 377, 292, 287

[56] References Cited

U.S. PATENT DOCUMENTS

| | | | |
|---|---|---|---|
| 3,801,450 | 4/1974 | Barthels et al. | 376/429 |
| 4,043,136 | 8/1991 | Hunsbedt et al. | 376/299 |
| 4,515,349 | 5/1985 | Groves | 256/1 |
| 4,678,626 | 7/1987 | Germer | 376/299 |
| 4,693,337 | 9/1987 | Timmermeister | 181/272 |
| 5,043,135 | 8/1991 | Hunsbedt et al. | 376/299 |

*Primary Examiner*—Daniel D. Wasil
*Attorney, Agent, or Firm*—J. S. Beulick

[57] ABSTRACT

A baffle is provided between a relatively hot containment vessel and a relatively cold silo for enhancing air cooling performance. The baffle includes a perforate inner wall positionable outside the containment vessel to define an inner flow riser therebetween, and an imperforate outer wall positionable outside the inner wall to define an outer flow riser therebetween. Apertures in the inner wall allow thermal radiation to pass laterally therethrough to the outer wall, with cooling air flowing upwardly through the inner and outer risers for removing heat.

20 Claims, 3 Drawing Sheets

LIQUID METAL REACTOR AIR COOLING BAFFLE

The U.S. Government has rights in this invention in accordance with Contract DE-AC03-89SF17445 awarded by the Department of Energy.

The present invention relates generally to nuclear reactors, and, more specifically, to air cooling thereof.

BACKGROUND OF THE INVENTION

In one type of nuclear reactor referred to as an advanced liquid metal reactor (ALMR) a nuclear reactor core is submerged in a hot liquid metal such as liquid sodium within a reactor vessel. The liquid metal is used for cooling the reactor core, with the heat absorbed thereby being used for producing power in conventional manners. Surrounding the reactor vessel is a containment vessel, with the space therebetween being filled with an inert gas such as argon.

Operation of the reactor is controlled by control rods which are selectively inserted into or withdrawn from the reactor core. The control rods may be fully inserted therein in order to shutdown the reactor core. However, residual decay heat continues to be generated from the core for a certain time, with the heat being transferred by thermal radiation from the reactor vessel to the containment vessel which increases its temperature. heat from the containment vessel will also radiate outwardly toward a concrete silo spaced outwardly therefrom. In order to prevent excessive heating of these components, a passive heat removal system referred to as the reactor vessel auxiliary cooling system (RVACS) is provided and is disclosed in U.S. Pat. No. 5,043,135 for example, which is assigned to the present assignee.

In the current RVACS, an imperforate heat collector cylinder is disposed concentrically between the containment vessel and the silo to define an air riser between its inner surface and the containment vessel, and an air downcomer between its outer surface and the silo. Atmospheric air is suitably channeled downwardly through the downcomer to its bottom wherein it is turned upwardly into the air riser for flow upwardly to cool the containment vessel. The inner surface of the collector cylinder receives thermal radiation from the containment vessel, with the heat therefrom being transferred by natural convection into the rising air for flow upwardly to remove the heat. The outer surface of the collector cylinder includes thermal insulation to reduce transfer of the heat from the collector cylinder into the silo and into the air flowing downwardly in the downcomer. The greater the differential in temperature between the relatively cold downcomer air and the heated air within the riser, the greater will be the degree of natural circulation for driving the air cooling passively without motor-driven pumps.

In this configuration, the average temperature of the containment vessel during steady-state operation as well as the transient peak temperatures thereof following certain transient operations, are relatively high, which requires that the containment vessel be designed to high-temperature ASME code requirements, which increases the cost thereof. Furthermore, the thermal insulation provided over the outer surface of the heat collector cylinder is complex and relatively expensive to ensure that the concrete silo is not excessively heated. Accordingly, improved air cooling of the containment vessel is desired for reducing complexity and cost of the cooling system.

SUMMARY OF THE INVENTION

A baffle is provided between a relatively hot containment vessel and relatively cold silo for enhancing air cooling performance. The baffle includes a perforate inner wall positionable outside the containment vessel to define an inner flow riser therebetween, and an imperforate outer wall positionable outside the inner wall to define an outer flow riser therebetween. Apertures in the inner wall allow thermal radiation to pass laterally therethrough to the outer wall, with cooling air flowing upwardly through the inner and outer risers for removing heat.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
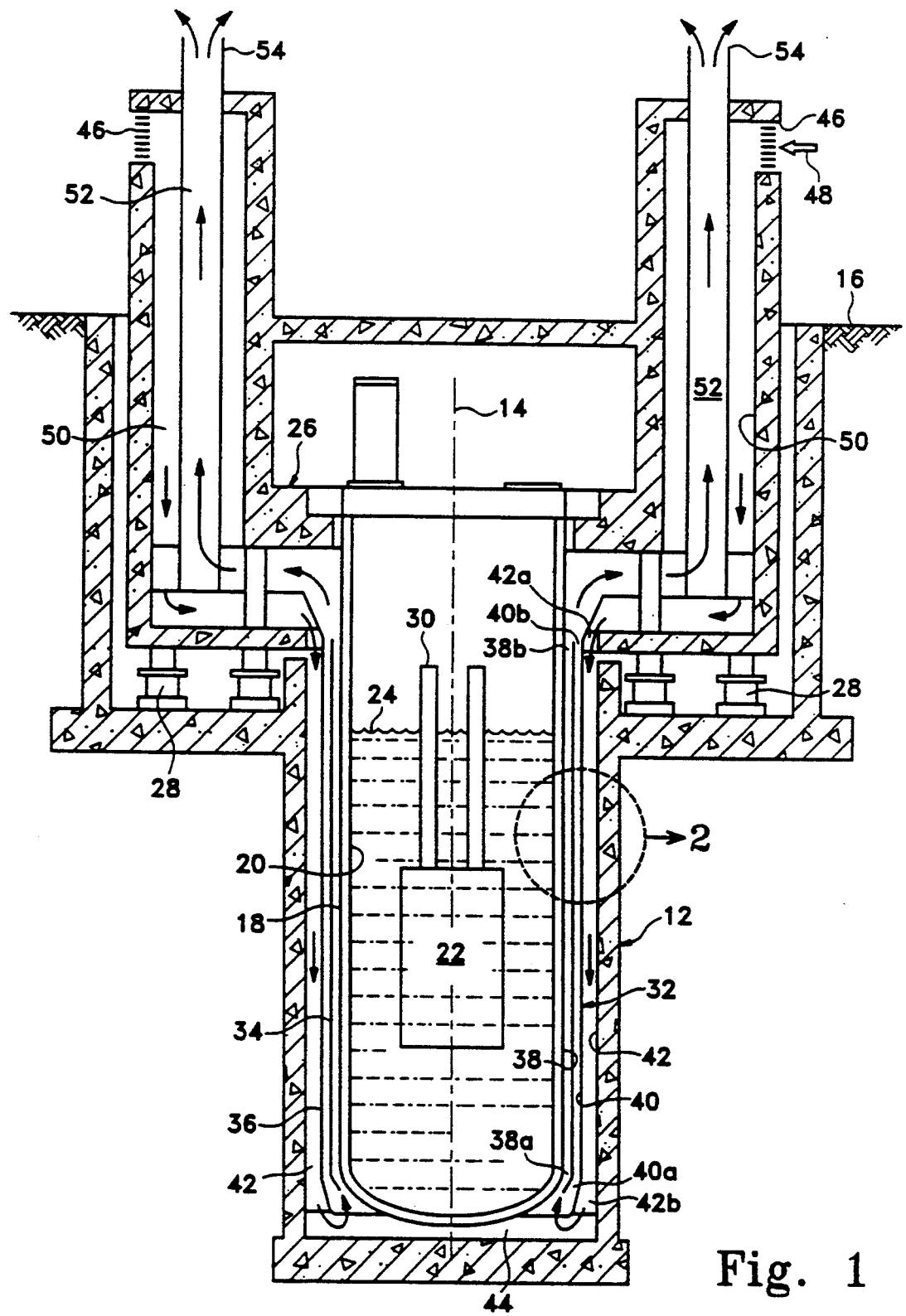
FIG. 1 is a schematic, elevational, partly sectional view of an exemplary liquid metal nuclear reactor plant having a baffle disposed between a containment vessel and a concrete silo for cooling the containment vessel in accordance with one embodiment of the present invention.

Illustrated schematically in FIG. 1 is an exemplary advanced liquid metal reactor plant 10 having a concrete silo 12 which is annular or circular in the exemplary embodiment illustrated and has a vertical, axial centerline axis 14. The silo is preferably disposed under the ground 16 and contains concentrically therein an annular containment vessel 18 in which is concentrically disposed a reactor vessel 20 having a nuclear reactor core 22 submerged in a liquid metal coolant 24 such as liquid sodium.

In the embodiment illustrated in FIG. 1, the containment and reactor vessels 18, 20 are supported or suspended vertically downwardly from an upper frame 26, which in turn is supported on the concrete silo 12 by a plurality of conventional seismic isolators 28 to maintain the structural integrity of the containment and reactor vessels 18, 20 during earthquakes and allow uncoupled movement between the vessels 18, 20 and the surrounding concrete silo 12.

The reactor core 22 is controlled by a plurality of conventional control rods 30 (only two of which are illustrated) which are selectively inserted into or withdrawn from the core 22. When fully inserted, the control rods 30 are effective for shutting down the reactor core 22, with residual decay heat nevertheless being generated for a certain time following the shutdown. In order to remove the residual decay heat, a passive heat removal system referred to as the reactor vessel auxiliary cooling system (RVACS) is provided. In the RVACS, a space is provided between the reactor and containment vessels 18, 20 and is filled with an inert gas such as argon. Heat from the liquid metal 24 is transferred by thermal radiation through the argon-filled space and heats the containment vessel 18. In order to passively remove the heat from the containment vessel 18, a double-walled baffle 32 in accordance with the present invention is disposed between the containment vessel 18 and the silo 12 to provide enhanced air-side cooling performance.

Figure 2:
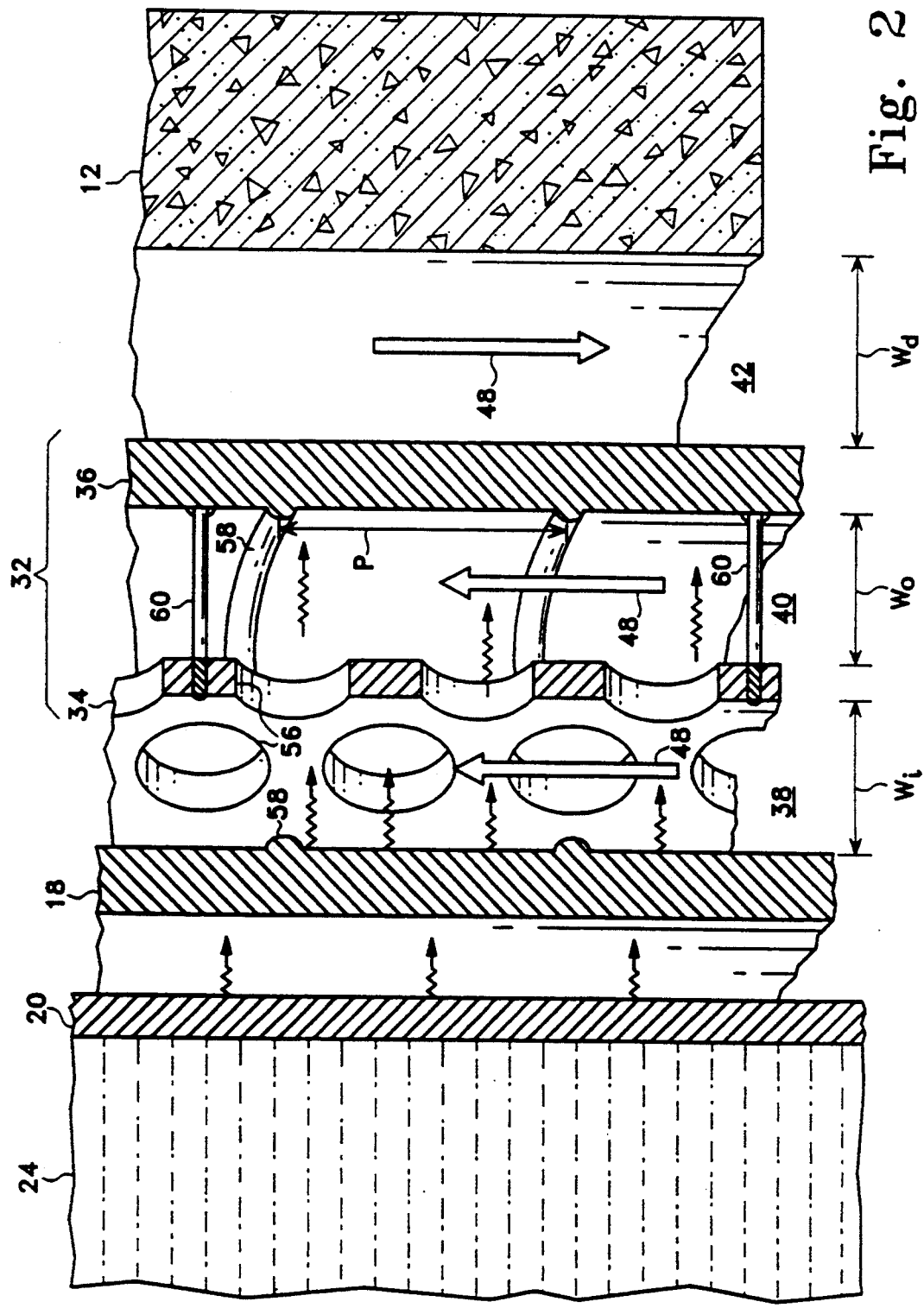
FIG. 2 is an enlarged, elevational, partly sectional view of a portion of the reactor plant illustrated in FIG. 1 within the dashed circle labeled 2 showing a double-walled baffle between the containment vessel and the concrete silo for enhancing air performance.
Figure 3:
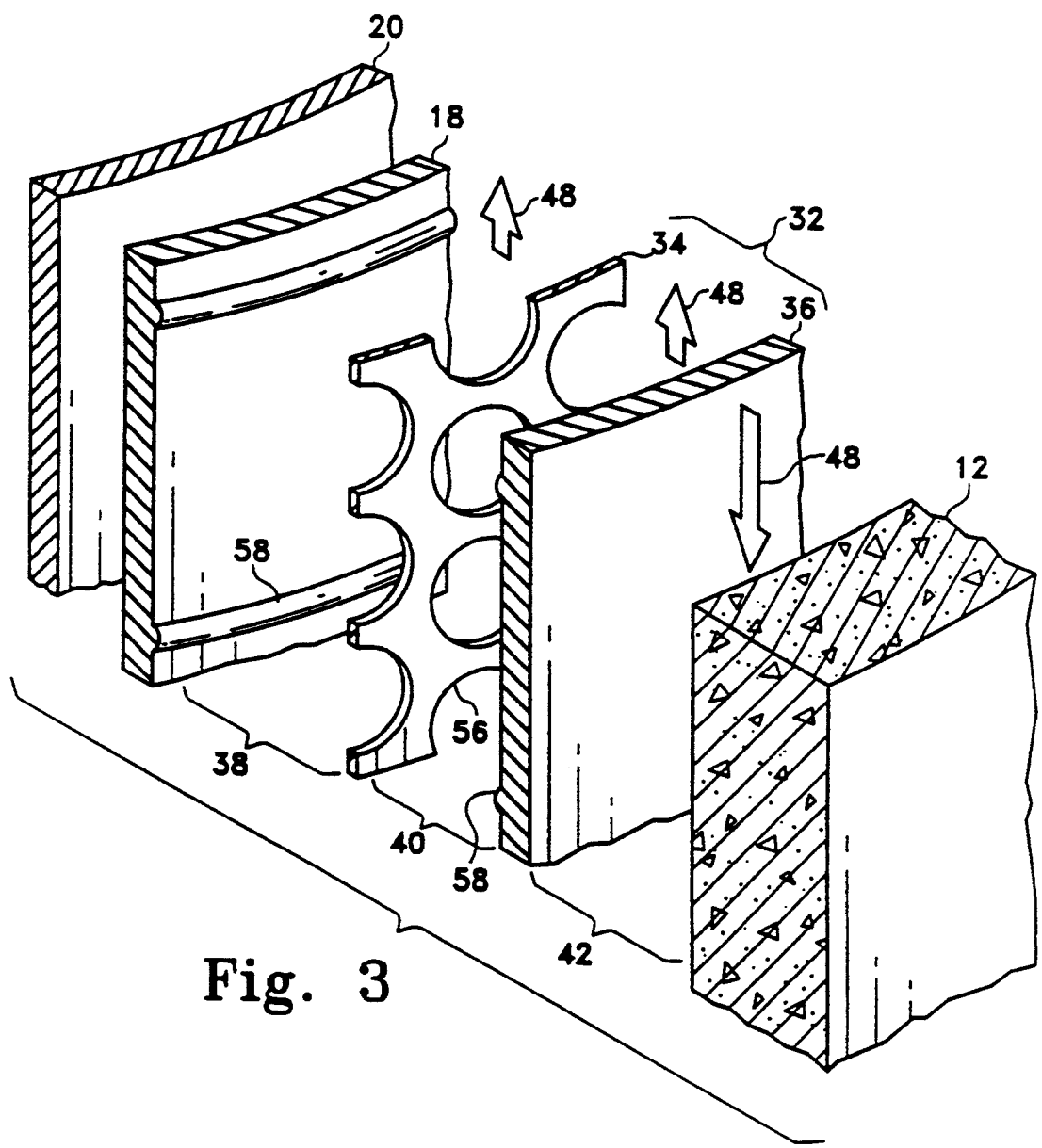
FIG. 3 is a perspective view of a portion of the baffle illustrated in FIG. 2 disposed between the containment vessel and the concrete silo.

As illustrated with more particularity in FIGS. 2 and 3, the baffle 32 is an assembly of a perforate inner heat collector wall 34 and an imperforate outer heat collector wall 36 spaced in turn between the containment vessel 18 and the silo 12. In the exemplary embodiment illustrated in FIGS. 2 and 3, the containment vessel 18, the inner wall 34, the outer wall 36, and the silo 12 are annular and concentric to each other, with the inner and outer walls 34, 36 being cylinders. The inner wall 34 is configured or sized to be positioned radially outside the containment vessel 18 and spaced radially outwardly therefrom to define a radially inner flow channel or riser 38 therebetween. The outer wall 36 is similarly configured or sized to be positioned radially outside the inner wall 34 and spaced radially outwardly therefrom to define a radially outer flow channel or riser 40 therebetween. And, the outer wall 36 is also spaced radially inwardly from the silo 12 to define a radially outer flow channel or downcomer 42 therebetween.

The baffle 32 as illustrated in FIG. 1 extends vertically from a lower plenum 44 defined between the bottom of the containment vessel 18 and the bottom of the silo 12, and extends vertically upwardly to a suitable elevation above the top level of the liquid metal 24 within the reactor vessel 20. The outer riser 40 has an inlet 40a at the bottom thereof and an outlet 40b at the top thereof. The inner riser 38 has an inlet 38a at the bottom thereof and an outlet 38b at the top thereof. The downcomer 42 has an inlet 42a at the top thereof, and an outlet 42b at the bottom thereof which is disposed in the lower plenum 44 in flow communication with both inlets 38a and 40a of the inner and outer risers 38, 40.

Disposed in the building upper frame 26 at a suitable elevation above the ground 16 is one or more air intakes 46 for receiving atmospheric air 48 for use in cooling the containment vessel 18 and the baffle 32. An intake duct or plenum 50 extends in flow communication downwardly from the intake 46 to the downcomer inlet 42a for channeling the cooling air 48 downwardly thereto. The cooling air 48 is channeled downwardly through the downcomer 42 and then turns radially inwardly from the outlet 42b thereof and upwardly into both riser inlets 38a and 40a. The cooling air 48 is then channeled upwardly through the inner and outer risers 38 and 40 to their outlets 38b, 40b. The riser outlets 38b, 40b are disposed in flow communication with an outlet duct or plenum 52 which rises vertically upwardly through the building upper frame 26 and has one or more discharge openings or vents 54 for discharging the heated air from the plant 10 after cooling the containment vessel 18 and the baffle 32. Since the containment vessel 18 is relatively hot from being heated by decay heat from the reactor core 22, the heat is dissipated in the cooling air 48 within the inner and outer risers 38, 40 which decreases the air density and increases its buoyancy for providing a natural circulation flow upwardly therethrough for discharge through the outlet plenum 52 and vents 54. The cooling air 48 entering the intake 46 is relatively cold and is denser than the air rising in the risers 38, 40 and therefore falls by gravity downwardly through the downcomer 42 to assist in the natural or passive circulation of the cooling air 48 through the downcomer 42 and up through the risers 38 and 40.

FIGS. 2 and 3 illustrate the double-walled baffle 32 in accordance with one embodiment of the present invention for enhancing heat removal from the containment vessel 18. More specifically, heat transfer from the outer surface of the containment vessel 18 occurs partly by natural convection directly into the upwardly rising cooling air 48 and partly by thermal radiation to both inner and outer walls 34 and 36 which act as heat collectors as well as providing increased surface area to dissipate heat into the rising cooling air 48 by natural convection. The perforate inner wall 34 includes a plurality of apertures 56 which, in the exemplary embodiment illustrated, are circular holes spaced vertically and horizontally apart. The apertures 56 are sized for allowing a portion of the thermal radiation emanating from the containment vessel 18, as shown by the wavy arrows, to pass laterally through the inner wall 34 to the outer wall 36. In this way, thermal radiation from the containment vessel 18 is radiated to both inner and outer walls 34, 36 and may then be dissipated into the cooling air 48 by natural convection.

The degree of perforation, or perforation density is the collective area of the apertures 56 relative to the total available surface area of the inner wall 34. In the exemplary embodiment illustrated in FIGS. 2 and 3, the perforation density is about 50% of the total area to ensure an effective amount of thermal radiation reaching and being absorbed by the outer wall 36. Since heat from both walls 34, 36 is dissipated into the rising cooling air 48 in both risers 38, 40, the size or diameter of the apertures 56 may be suitably optimized for balancing heat transfer into the separate cooling air flows in the risers 38, 40.

The inner riser 38 has an inner width $W_i$ as shown in FIG. 2 and measured laterally or radially outwardly from between the outer surface of the containment vessel 18 and the inner surface of the inner wall 34. Similarly, the outer riser 40 has an outer width $W_o$ defined laterally or radially outwardly between the outer surface of the inner wall 34 and the inner surface of the outer wall 36. And, the downcomer 42 has a width $W_d$ measured radially outwardly between the outer surface of the outer wall 36 and the inner surface of the silo 12. The riser inner and outer widths $W_i$, $W_o$ are predetermined for controlling the upward velocity of the cooling air 48 in both risers 38, 40, and the downcomer width $W_d$ is correspondingly selected to ensure an adequate supply of cooling air 48 downwardly therethrough and into both risers 38, 40, and also to provide sufficient space for movement of the reactor vessel assembly during seismic events.

In the exemplary embodiment illustrated in FIG. 2, the outer riser width $W_o$ is less than the inner riser width $W_i$ due in part to the increasing flow area at the larger diameter of the outer riser as compared to the smaller diameter of the inner riser 38, and due to heating of the inner wall 34 prior to heating of the outer wall 36. The convective heat transfer rate to the cooling air 48 conventionally depends on the temperature difference between the cooling air 48 and the heat-emanating surfaces of the inner and outer walls 34, 36, which may be made of steel for example. The convective heat transfer coefficient in turn depends on the velocity of the cooling air 48 upwardly through the individual air risers 38 and 40. Accordingly, the size of the apertures 56 and the riser widths $W_i$ and $W_o$ may be suitably varied to optimize heat removal from the containment vessel 18. The perforation density of the apertures 56 may be suitably varied to optimize heat transfer of particular reactor designs. The perforation density may be selected to balance as desired thermal radiation absorbed by the inner and outer walls 34 and 36. And since the inner wall 34 adds additional convective heat transfer area from both its inner and outer surfaces over that provided solely by the inner surface of the outer wall 36, an increase in heat dissipation to the cooling air 48 is obtained with suitable balance between the inner and outer risers 38 and 40. The additional surface area of the inside surfaces of the apertures 56 themselves may also be used for dissipating heat and for promoting cross flow between the inner and outer risers 38 and 40 as desired.

The enhanced heat dissipation attainable from using the perforate inner wall 34 in addition to the outer wall 36 significantly reduces the average temperature of both the containment vessel 18 itself and the outer wall 36 as well as reduces the transient peak temperatures thereof during transient operation of the reactor. Accordingly, the containment vessel 18, as well as the outer wall 36, may be designed to conventionally known low-temperature ASME code requirements rather than current high-temperature requirements in a configuration using the outer heat collector wall 36 itself without the perforate inner wall 34. This reduces the complexity and cost of the design.

Reduction of the temperature of the outer wall 36 due to the present invention will also allow elimination of the relatively complex and expensive thermal insulation on the outer surface of the outer wall 36 required in a conventional design without the perforate inner wall 34. The outer wall 36 therefore may have an outer surface directly facing the inner surface of the concrete silo 12 and is characterized by the absence of thermal insulation thereon. The silo 12 is relatively cold compared to the containment vessel 18 and will remain relatively cold without concern for excessive temperature rise thereof due to heat transfer from the outer wall 36. The cost reduction associated with eliminating the thermal insulation around the outer wall 36 will substantially offset the additional costs of incorporating the perforate inner wall 34.

An additional advantage of eliminating thermal insulation from the outer wall 36 allows significant heat removal from the containment vessel 18 in the event of a postulated complete blockage of the cooling air 48 through the downcomer 42 and the risers 38 and 40 of the RVACS. In this situation, heat will be transferred from the outer wall 36 directly into the concrete silo and in turn into the surrounding earth without obstruction by the typically required thermal insulation.

If desired, a plurality of conventional, vertically spaced horizontal boundary layer trips 58 as shown in FIGS. 2 and 3 may be disposed on at least one and preferably both the outer surface of the containment vessel 18 or the inner surface of the outer wall 36 for increasing heat transfer to the cooling air 48 flowing upwardly in the inner and outer risers 38, 40, respectively. The trips 58 may be appropriately shaped such as semicircular protrusions from the respective sidewalls having a vertical pitch P therebetween selected for tripping boundary layer airflow for enhancing heat transfer as is conventionally known.

In one embodiment analyzed, the trips 58 had a height of 6.4 mm and a pitch P of 152 mm. The apertures 56 have a diameter of 51 mm with a perforation density of about 50%. The inner riser width $W_i$ was about 127 mm and the outer riser width $W_o$ was about 102 mm. The thicknesses of the containment vessel 18, inner wall 34, and outer wall 36 were about 25 mm, 9 mm, and 25 mm, respectively. The analysis predicted a thermal performance enhancement of about 8% with the use of the perforated baffle 34 in combination with the outer wall 36 as opposed to using the outer wall 36 alone, with an additional significant enhancement gain utilizing the trips 58 in combination therewith.

As illustrated schematically in FIG. 1, the outer wall 36 is suspended or supported solely at its upper end from or by the upper frame 26 to uncouple its vibratory response from the concrete silo 12 during a seismic event. Similarly, the inner wall 34 may be suspended from the upper frame 26 at its top end by being joined to the outer wall 36 as illustrated in FIG. 2 by a plurality of circumferentially and vertically spaced stud bolts 60 suitably welded at both ends thereof to the inner wall 34 and the outer wall 36. The bolts 60 may be located solely near the top of the outer wall 36 or may be used along the entire vertical height thereof for suitably supporting the inner wall 34 to the outer wall 36 and in turn to the upper frame 26. Since the outer wall 36 supports the weight of the inner wall 34 in this embodiment, the outer wall 36 is preferably thicker than it otherwise would be for accommodating the additional loads therefrom.

Since the inner wall 34 bifurcates the space between the containment vessel 18 and the outer wall 36, the inner riser width $W_i$ reduces the available space for in-service inspection of the containment vessel 18. However, since the outer wall 36 does not include thermal insulation over its outer surface, the inspection thereof may be more readily performed on its outside surface from the downcomer 42.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A baffle in combination with a containment vessel disposed inside a silo and wherein:
    said baffle comprises a perforate inner wall installed between said containment vessel and said silo, and an imperforate outer wall installed between said inner wall and said silo;
    said containment vessel contains a reactor vessel having a reactor core submerged in a liquid metal;
    said inner wall is spaced radially outwardly from said containment vessel to define an inner riser therebetween for channeling cooling air upwardly therein;
    said outer wall is spaced radially outwardly from said inner wall to define an outer riser therebetween for channeling cooling air upwardly therein;
    said outer wall is spaced radially inwardly from said silo to define a radially outer flow downcomer therebetween for channeling cooling air downwardly therein; and said downcomer is disposed in flow communication with both said inner and outer risers at bottom ends thereof for channeling downwardly flowing cooling air upwardly into both said inner and outer risers for cooling said containment vessel, said inner wall comprising a plurality of apertures spaced vertically and horizontally and sized for allowing a portion of thermal radiation from said containment vessel to pass laterally through said inner wall to said outer wall.

2. A baffle combination according to claim 1 wherein:
said inner riser has an inner width laterally between said containment vessel and said inner wall;
said outer riser has an outer width laterally between said inner wall and said outer wall; and
said outer width is less than said inner width.

3. A baffle combination according to claim 1 wherein said containment vessel, said inner wall, said outer wall, and said silo are annular and concentric.

4. A baffle combination according to claim 1 wherein said inner wall is joined to said outer wall by a plurality of spaced stud bolts.

5. A baffle combination according to claim 1 further comprising a plurality of vertically spaced horizontal boundary layer trips disposed on at least one of an outer surface of said containment vessel or an inner surface of said outer wall for increasing heat transfer to said cooling air flowing upwardly in said inner and outer risers, respectively.

6. A baffle combination according to claim 1 wherein said outer wall has an outer surface facing said silo characterized by the absence of thermal insulation thereon.

7. A baffle combination according to claim 1 wherein:
said inner riser has an inlet at a bottom thereof, and an outlet at a top thereof;
said outer riser has an inlet at a bottom thereof, and an outlet at a top thereof;
said downcomer has an inlet at a top thereof, and an outlet at a bottom thereof disposed in flow communication with both said inlets of said inner and outer risers for channeling said cooling air thereto; and
said inner and outer riser outlets discharge air heated therein vertically upwardly.

8. A baffle for enhancing air cooling of a containment vessel concentrically arranged inside a silo of a nuclear reactor with an annular volume therebetween, said containment vessel encircling a reactor vessel having a nuclear fuel core submerged in liquid coolant, comprising:
a cylindrical inner wall arranged inside said annular volume and concentric with said containment vessel to form an inner riser therebetween for channeling cooling air upward; and
a cylindrical outer wall arranged inside said annular volume and concentric with said containment vessel, said outer wall being arranged between said inner wall and said silo to form an outer riser between said inner wall and said outer wall for channeling cooling air upward, and to form a downcomer between said outer wall and said silo for channeling cooling air downward,
wherein said inner wall comprises a plurality of apertures for allowing the passage of thermal radiation from said containment vessel to said outer wall.

9. The baffle as defined in claim 8, wherein said downcomer is disposed in flow communication with both said inner and outer risers at bottom ends thereof for channeling downwardly flowing cooling air upwardly into both said inner and outer risers for cooling said containment vessel.

10. The baffle as defined in claim 8, wherein said inner wall is supported by said outer wall.

11. The baffle as defined in claim 8, wherein said outer wall has a radially outer circumferential surface facing said silo with no thermal insulation thereon.

12. The baffle as defined in claim 8, wherein said outer wall has a radially inner circumferential surface facing said inner wall with means for generating turbulence formed thereon.

13. The baffle as defined in claim 8, wherein said containment vessel has a radially outer circumferential surface facing said inner wall with means for generating turbulence formed thereon.

14. The baffle as defined in claim 8, wherein said apertures are circular.

15. In a nuclear reactor comprising a reactor vessel having a nuclear fuel core submerged in liquid coolant, a containment vessel encircling said reactor vessel, a baffle encircling said containment vessel for enhancing air cooling thereof, and a silo encircling said baffle, said baffle comprising a cylindrical outer wall arranged between and concentric with said containment vessel and said silo, said outer wall and said silo forming a downcomer therebetween for channeling cooling air downward, and said containment vessel and said outer wall forming a riser therebetween for channeling cooling air from said downcomer upward, the improvement wherein:
a cylindrical inner wall is arranged between and concentric with said containment vessel and said outer wall for dividing said riser into inner and outer risers, said inner wall comprising a plurality of apertures for allowing the passage of thermal radiation from said containment vessel to said outer wall.

16. The baffle as defined in claim 15, wherein said inner wall is supported by said outer wall.

17. The baffle as defined in claim 15, wherein said outer wall has a radially outer circumferential surface facing said silo with no thermal insulation thereon.

18. The baffle as defined in claim 15, wherein said outer wall has a radially inner circumferential surface facing said inner wall with means for generating turbulence formed thereon.

19. The baffle as defined in claim 15, wherein said containment vessel has a radially outer circumferential surface facing said inner wall with means for generating turbulence formed thereon.

20. The baffle as defined in claim 15, wherein said apertures are circular.

* * * * *